(12) United States Patent
Frantz et al.

(10) Patent No.: US 7,240,120 B2
(45) Date of Patent: Jul. 3, 2007

(54) UNIVERSAL DECODER FOR USE IN A NETWORK MEDIA PLAYER

(75) Inventors: Gene A Frantz, Missouri City, TX (US); Pedro Gelabert, Sugar Land, TX (US); Mark Nadeski, Houston, TX (US); Jason Kridner, Houston, TX (US)

(73) Assignee: Texas Instruments Incorporated, Dallas, TX (US)

( * ) Notice: Subject to any disclaimer, the term of this patent is extended or adjusted under 35 U.S.C. 154(b) by 787 days.

(21) Appl. No.: 10/196,919

(22) Filed: Jul. 17, 2002

(65) Prior Publication Data

US 2003/0033449 A1 Feb. 13, 2003

Related U.S. Application Data

(60) Provisional application No. 60/311,795, filed on Aug. 13, 2001.

(51) Int. Cl.
*G06F 15/16* (2006.01)

(52) U.S. Cl. ............... 709/231; 709/201; 709/236; 710/1

(58) Field of Classification Search ........... 709/231, 709/217–219, 201–203, 236, 238; 710/1
See application file for complete search history.

(56) References Cited

U.S. PATENT DOCUMENTS 5,832,120 A * 11/1998 Prabhakar et al. ........ 382/233
6,205,187 B1 * 3/2001 Westfall ................ 375/341
6,314,565 B1 * 11/2001 Kenner et al. ........... 717/171
6,816,194 B2 * 11/2004 Zhang et al. ........ 375/240.27
6,845,398 B1 * 1/2005 Galensky et al. .......... 709/231
6,907,021 B1 * 6/2005 Nelson ................... 370/338

FOREIGN PATENT DOCUMENTS

| EP | 0 813 147 A | 12/1997 |
| EP | 0 911 728 A | 4/1999 |
| WO | WO 98 46024 A | 10/1998 |

* cited by examiner

*Primary Examiner*—Saleh Najjar
*Assistant Examiner*—Faruk Hamza
(74) *Attorney, Agent, or Firm*—Robert D. Marshall, Jr.; W. James Brady; Frederick J. Telecky, Jr.

(57) ABSTRACT

A media player coupled to a network contains a processor, non-volatile memory, volatile memory, a driver, and input and output ports. The media player receives a media file over the network that contains an encoded media stream and a universal decoder. The player's processor converts or translates (or otherwise generates) the universal decoder into a player-specific decoder which may differ from the universal decoder. A library of routines stored in the non-volatile memory is used to create the player-specific decoder. The media stream downloaded to the media player may comprise audio, video, or any other desired type of media. In this manner, each media player can generate a decoder that differs, not only from the universal decoder, but may also differ from other media players thereby alleviating the burden on the media source from having to download the encoded media with a decoder specific to the target media player.

21 Claims, 1 Drawing Sheet

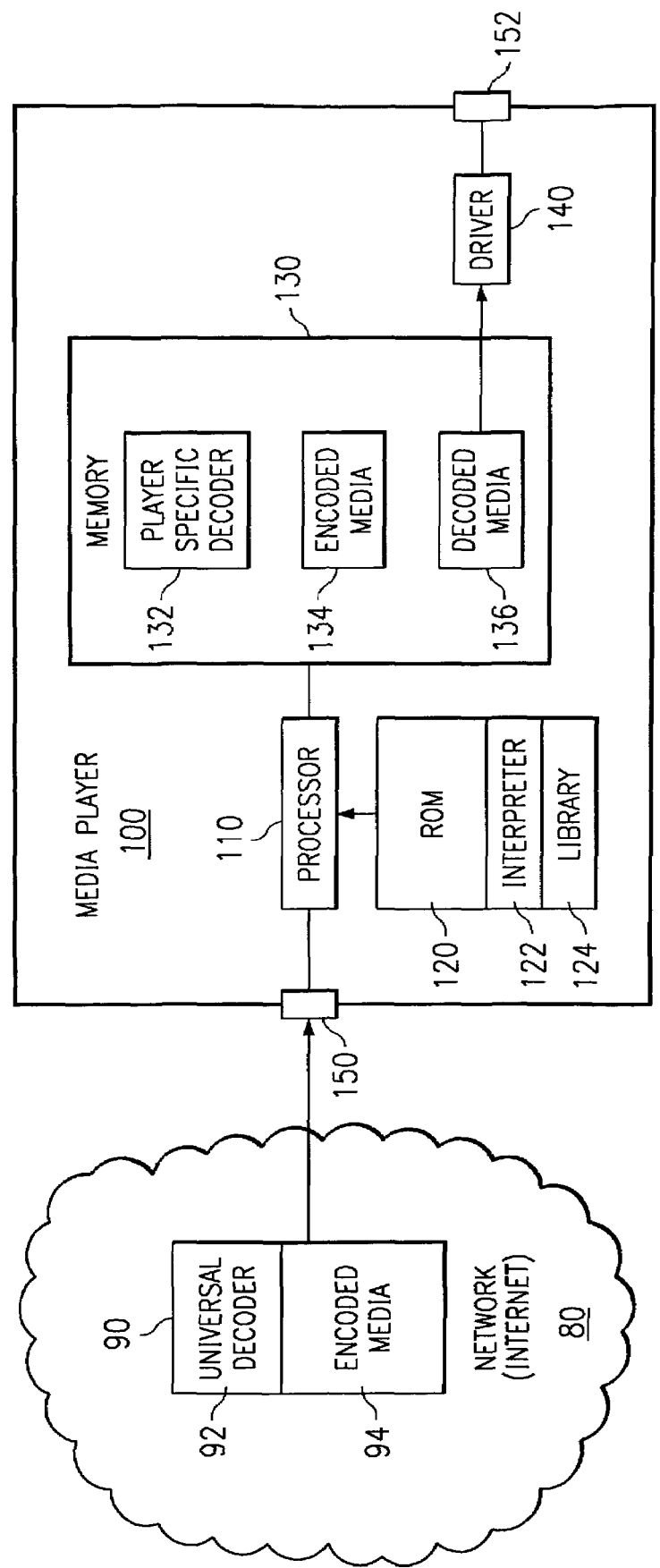

UNIVERSAL DECODER FOR USE IN A NETWORK MEDIA PLAYER

This application claims priority under 35 USC §119(e)(1) of Provisional Application No. 60/311,795, filed Aug. 13, 2001.

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to a universal download language for use by a network appliance. More particularly still, the invention relates to a universal language that can be received over the Internet and executed by a variety of audio appliances for playing encoded audio files.

2. Background of the Invention

The proliferation of the Internet in recent years has also generated the development of new technologies that take advantage of the Internet's world wide communication abilities. For example, audio streaming has made it possible to use a computer to listen to Internet-based radio stations which are located anywhere in the world. Of course, using one's personal laptop or desktop computer system to listen to music is acceptable, not always entirely the most satisfactory means for enjoying music. First, it requires the user to have a computer. Although many people have computers, not everyone does. Second, even if a person has a computer, the computer must be on. Booting up a computer may take several minutes and thus may be an annoying process just to listen to music. Additionally, a person using his or her computer to listen to music is generally limited in terms of where the music can be heard (i.e., in the general vicinity of the computer itself).

Because of these and other reasons, audio players have become available. By way of a definition, an "audio player" (also referred to as an audio "appliance") is generally any device through which audio can be heard. With this definition, a laptop or desktop computer could be considered an audio player. In addition to general purpose conventional computer systems, audio players may also include equipment specially designed to receive an audio file from a network and play it. For example, MP3 players can be downloaded with an MP3 encoded audio file and played through a pair of headphones connected to the player. The encoding process involves compressing the audio information so that a smaller, compressed file can be stored and transmitted over a network rather than the original audio information.

It is common during the development of new technologies for competing implementations to be offered. Sometimes, one implementation "wins" out in the market place. During the infancy of the video cassette recorder ("VCR") development, VHS and BETA MAX formats were available, but in the end, VHS became the defacto standard. Other times, more than one implementation survives and the market accommodates multiple implementations.

At present in the Internet audio market, numerous different encoding schemes are available to encode an audio file. The MP3 and AAC standards are two examples of such encoding schemes. Of course, once an audio file is encoded, it must be decoded to be played. Further, the particular decoding methodology must generally be the reciprocal process to how the file was encoded. Thus, if a song, for example, is encoded using one particular encoding technique, it must be decoded using that same technique. Multiple encoding/decoding schemes complicates managing, downloading and playing encoded audio files. For a person to be able to listen to a desired audio file encoded with a particular encoding scheme, that person's audio player must be capable of decoding the file according to the encoding scheme used to encode the file in the first place. With multiple encoding schemes used by audio content providers, audio players conceivably would have to implement all of the various decoding schemes to be able to provide the person the ability to listen to all possible audio content. Currently, there are approximately nine encoding/decoding schemes and thus an audio player would have to include all nine schemes and enough memory to store all such decoders. As more encoding/decoding schemes become available, this burden on the players increases.

Further complicating matters is the fact that more than one off-the-shelf hardware platform is available for suppliers to include in their audio players. Currently, Texas Instruments, Cirrus Logic and possibly others provide a chip set that designed for audio players to decode and play audio files. All else being equal, each audio file may have to be encoded differently to work on each such hardware platform. In other words, an audio file encoded for a Texas Instruments hardware platform may not work on a Cirrus Logic hardware platform, and vice versa.

Thus, with multiple encoding/decoding formats and multiple hardware platforms, managing and providing an efficient audio distribution scheme can be complicated indeed. Each song may need to be encoded multiple different ways to be accessible and usable by audio players with different decoding algorithms programmed into them. Alternatively, audio players may have to be programmed with all possible decoding algorithms. Even then, a problem arises as to what to do with existing audio players when new encoding/decoding schemes become available. In short, this area is in dire need for an improvement that solves this problem. Despite the advantage such a solution would provide, to date no such solution is known to exist.

BRIEF SUMMARY OF THE INVENTION

The present invention solves the deficiencies of the prior art by a media player coupled to a network. The media player contains a processor, non-volatile memory, volatile memory, a driver, and input and output ports. The media player can receive media files from the network with each file containing an encoded media stream and a universal decoder. Executing interpreter software stored in non-volatile memory, the player's processor converts or translates (or otherwise generates) the universal decoder into a player-specific decoder, which may differ from the universal decoder. A library of routines stored in the non-volatile memory is used to create the player-specific decoder. The media stream downloaded to the media player may comprise audio, video, or any other desired type of media. As such, the media player may comprise an audio player, a video player and the like.

In this manner, each media player can generate a decoder that differs, not only from the universal decoder, but may also differ from other media players. This alleviates the burden on the source of the media on the network from having to download the encoded media with a decoder specific to the target media player. These and other aspects of the present invention will become apparent upon analyzing the drawings, detailed description and claims, which follow.

BRIEF DESCRIPTION OF THE DRAWINGS

For a detailed description of the preferred embodiments of the invention, reference will now be made to the accompanying drawings in which:

FIG. 1 is a block diagram of a network media player constructed in accordance with a preferred embodiment of the invention.

NOTATION AND NOMENCLATURE

Certain terms are used throughout the following description and claims to refer to particular system components. As one skilled in the art will appreciate, processor and computer companies may refer to a component and sub-components by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either a direct or indirect electrical connection. Thus, if a first device couples to a second device, that connection may be through a direct electrical connection, or through an indirect electrical connection via other devices and connections. To the extent that any term is not specially defined in this specification, the intent is that the term is to be given its plain and ordinary meaning.

DETAILED DESCRIPTION OF THE PREFERRED EMBODIMENTS

In accordance with a preferred embodiment of the invention, a media file containing encoded media information is transmitted from a network location to a media player coupled to a network, or otherwise provided to the media player. The media file preferably includes a universal decoder that the network media player uses to decode the encoded media information. The encoded media downloaded to the media player may include an audio stream, video stream, a combination of audio and video, or any other type of media information.

Referring now to FIG. 1, the present invention, constructed in accordance with the preferred embodiment, comprises a media player 100 which can be coupled to a network 80. Network 80 may be the Internet, or any type of local or wide area network. The communication link between network 80 and the media player 100 may be a physical link (e.g., telephone line, cable, etc.) or a wireless link. As shown, audio player 100 comprises a processor 110, a read only memory ("ROM") or other type of non-volatile memory 120, a volatile memory 130, an output driver 140, an input port 140, and an output port 152. Other components may be included as well, such as user controls, status indicators, a display, and a battery. Preferably, the processor 110 couples to the ROM 120, memory 130 and input port 150 via separate connections as shown, or one or more common busses if desired. The output driver 140 is shown coupled to the memory 130. Alternatively, the driver 140 may be coupled to the processor 110, instead of to the memory 130.

The particular components selected to implement the media player 100 of FIG. 1 can be any suitable components. If the media player 100 is intended to provide an audio function, the output driver 140 preferably includes an audio driver. As such, the audio driver 140 would include a digital-to-analog converter, amplifier and filtering circuitry to generate audio electrical signals. These signals are provided to the output port 152 which may include connections to a pair of speakers or headphones. Further still, one or more speakers can be included as part of the media player 100 itself in place of, or in addition to, output port 152. In the context of a video player, the driver 140 would be a video driver and the output port 152 would be a connection to a display device such as a video monitor using, e.g., the NTSC standard.

Referring still to FIG. 1, processor 110 executes software that preferably is stored in ROM 120 and transferred to non-volatile memory 130 for execution therefrom. Alternatively, the software can be executed directly from ROM 120 without being transferred to memory 130. At least one software application that is executed by processor 110 is an interpreter application 122. A library of routines 124 is also provided for use while executing interpreter 122. As will be explained below, such software is used to decode encoded media in accordance with a universally understood decoder.

An encoded media file 90 that is located on the network 80 is downloaded to the media player 100. The player 100 decodes the media file for presentation to a user. In accordance with a preferred embodiment of the invention, the media file 90 includes a universal decoder 92 appended to the file or otherwise included as part of the file. The media file 90 also includes an encoded media portion 94. As noted above, the encoded media portion 94 may comprise encoded audio and, as such, may be encoded according to any encoding algorithm suitable for audio such as MP3, AAC, and the like, now known or later developed. Such encoding algorithms preferably compress the data so that the information can be represented in fewer bytes of memory. Alternatively, the media file and universal decoder may reside on storage medium local to the player 100, such as a CD ROM, flash card, or ROM card.

The universal decoder 92 comprises information that the media player 100 uses to decode the encoded media 94. The interpreter software 122 executed by processor 110 in each media player 100 is written to understand the information provided in the universal decoder 92 and generate a player-specific decoder 132 which is written to memory 130. Accordingly, the universal decoder 92 can be executed by any media player regardless of model, manufacturer and the like as long as the media player includes an interpreter capable of reading and understanding the language of the universal decoder 92.

The universal decoder 92 can be implemented in a variety of ways. For example, the decoder may comprise a text script of commands or instructions in accordance with a predetermined syntax that the interpreter 122 of the media players 100 are programmed or otherwise designed to understand. For example, it may be necessary in the decoding process to perform a Fast Fourier Transform ("FFT") operation or an inverse Discrete Fourier Transform ("DFT"). Accordingly, the universal decoder 92 may include an instruction for performing, for example, an FFT function in accordance with universally understood syntax. The media player's processor 110 executes interpreter software 122 stored in ROM 122 in conjunction with various library routines 124 also stored in ROM 120 to generate a player-specific or unique decoder 132 and writes the player specific decoder 132 to memory 130.

The library routines 124 may comprise player-specific low level instructions which processor 110 executes to implement the instructions provided in the universal decoder 92. For example, in response to the decoder 92 requesting an FFT function to be performed, the interpreter 122 may call upon a particular FFT routine in the library 124 to perform the FFT function. In general, the library routines can comprise any well-known or custom designed algorithms that implement operations useful in decoding media information that has been encoded. As such, the library routines 124 are specific to the type of media being decoded (e.g., audio, video). Each manufacturer's library routines may be different than those provided by other manufacturers and, in general, are specific to the hardware components chosen to implement the media player 100. The designer of the decoder 92 may not know, or even care, how the FFT function is performed by the media player 100. Thus, each media player 100 can implement a function (e.g., FFT) in any suitable manner and universal decoder 92 will work satisfactorily with all such media players. It should be noted also that the universal decoder may include well-known parameters such as Huffman codes, filterbank coefficients and size parameters which provide guidance to the media player to construct a media-player specific decoder.

The processor 110 receives the encoded media 94 from the network 80 and preferably copies the encoded media 94 to memory 130 (represented as encoded media portion 134). Executing interpreter 122 in conjunction with library 124, the processor 110 translates or otherwise converts the universal decoder 92 to a player-specific decoder 132. The player-specific decoder 134 performs the same or similar functions to the universal decoder 92, but is specific to the particular media player 100. As such, although based on the same universal decoder, the player-specific decoder 132 may differ between different media players.

During or after the processor 110 generates the player-specific decoder 132, the processor stores that decoder in memory 130. Once created, the processor 110 executes the player-specific decoder 132 to decode the encoded media portion 134. The resulting decoded media preferably is also stored in memory 130 in decoded media buffer 136.

After the processor 110 completes the creation of the decoded media 136 using the player-specific decoder 132, output driver 140 retrieves the decoded media 136 from memory 130 and converts the decoded media 136 to suitable electrical signals to be provided to output port 152. Alternatively, encoded media 94 may be decoded and provided to output driver 140 without being stored in memory at all. Through output port 152, the decoded media 136 can be listened to (in the case of audio), viewed (in the case of video), or both (in the case of video and audio) by an output device (e.g., speakers, headphones, video monitor, etc.). In alternative embodiment, driver 140 can begin retrieving decoded media 136 and generating suitable electrical signals therefrom before the processor 110 has completed decoding the encoded media 134. In this embodiment, for example, after the processor 10 has created and stored some decoded media data in buffer 136, the driver 140 can be begin retrieving and playing such data, while the processor 110 continues storing more decoded data in buffer 136.

As discussed above, the media player 100 is capable of receiving an encoded media stream with a universal decoder that the media player uses to create its own media player specific decoder. Using this player-specific decoder, the media player decodes the downloaded media and plays the decoded information at a user's request.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A media player which can be coupled to a network, comprising:
   a processor;
   a read only memory storing interpreter software and a library of routines executable by said processor, said interpreter software and said library of routines selected for a type media player from a plurality of corresponding sets of interpreter software and library of routines, each set corresponding to one of a plurality of types of media players;
   an input port coupled to said processor which receives encoded media and a universal decoder; and
   a driver coupled to said memory which provides decoded media to an output device;
   said processor operable to
   convert said universal decoder via said interpreter software and said library of routines into a player-specific decoder based on said universal decoder, and
   decode said encoded media via said player-specific decoder.

2. The media player of claim 1, wherein said encoded media comprises encoded audio and said driver generates audio electrical signals based on said decoded media.

3. The media player of claim 1, wherein said encoded media comprises encoded video and said driver generates video electrical signals based on said decoded media.

4. The media player of claim 1, wherein said encoded media comprises encoded audio and video and said driver generates video electrical signals based on said decoded media.

5. The media player of claim 1 further including volatile memory coupled to said processor in which said processor stores said player-specific decoder.

6. The media player of claim 5 wherein said volatile memory stores the decoded media.

7. The media player of claim 6 wherein said driver retrieves said decoded media from said volatile memory.

8. A method of providing a media stream to a user of a media player, comprising:
   (a) receiving an encoded media stream;
   (b) receiving a universal decoder associated with said encoded media stream;
   (c) storing interpreter software and a library of routines executable by a processor in read only memory on the media player, said interpreter software and said library of routines selected for a type media player from a plurality of corresponding sets of interpreter software and library of routines, each set corresponding to one of a plurality of types of media players;
   (d) converting said universal decoder to a media player-specific decoder format using the interpreter software and the library of routines; and (e) using said player-specific decoder to decode said encoded media stream.

9. The method of claim 8 wherein said encoded media stream comprises encoded audio.

10. The method of claim 8 wherein said encoded media stream comprises encoded video.

11. The method of claim 8 wherein said encoded media stream comprises encoded audio and video.

12. The method of claim 8 wherein the encoded media stream and universal decoder are received over a network.

13. The method of claim 8 wherein the encoded media stream and universal decoder are received over the Internet.

14. The method of claim 8 wherein the encoded media stream and universal decoder are received from a storage medium.

15. The method of claim 8 further including generating electrical signals indicative of said decoded media stream.

16. The method of claim 15 wherein said electrical signals represent audio and are provided to an audio output device.

17. The method of claim 15 wherein said electrical signals represent video and are provided to a video output device.

18. A media system, comprising:
   a network containing a file which includes an encoded media stream and a universal decoder; and
   a media player coupled to said network and comprising:
      a processor;
      a read only memory storing interpreter software and a library of routines executable by said processor, said interpreter software and said library of routines selected for a type media player from a plurality of corresponding sets of interpreter software and library of routines, each set corresponding to one of a plurality of types of media players;
      an input port coupled to said processor which receives said file;
      said processor operable to
         convert said universal decoder via said interpreter software and said library of routines to generate a player-specific decoder based on said universal decoder, and
         decode said encoded media via said player-specific decoder.

19. The media system of claim 18 wherein said media stream comprises audio.

20. The media system of claim 18 wherein said media stream comprises video.

21. A method of providing a media stream to a user of a media player comprising the steps of:
   encoding the media stream in a predetermined encoding/decoding format;
   generating a universal decoder for the predetermined encoding/decoding format applicable to a plurality of differing types of media players;
   generating for each of the plurality of differing types of media players interpreter software and a corresponding library of routines, each interpreter software and corresponding library of routines operable to convert the universal decoder to a player-specific decoder for the corresponding type media player;
   storing at the media player interpreter software and a library of routines corresponding to the type of the media player;
   transmitting the encoded media stream and the universal decoder to the media player;
   converting the universal decoder to a player-specific decoder at the media player employing the stored interpreter software and library of routines; and
   decoding the encoded media stream at the media player employing the player-specific decoder.

* * * * *